(12) United States Patent
Fabritius

(10) Patent No.: US 7,584,429 B2
(45) Date of Patent: Sep. 1, 2009

(54) METHOD AND DEVICE FOR OPERATING A USER-INPUT AREA ON AN ELECTRONIC DISPLAY DEVICE

(75) Inventor: Henna Fabritius, Tampere (FI)

(73) Assignee: Nokia Corporation, Espoo (FI)

( * ) Notice: Subject to any disclaimer, the term of this patent is extended or adjusted under 35 U.S.C. 154(b) by 525 days.

(21) Appl. No.: 10/877,794

(22) Filed: Jun. 25, 2004

(65) Prior Publication Data
US 2005/0022130 A1   Jan. 27, 2005

(30) Foreign Application Priority Data
Jul. 1, 2003    (WO) .................. PCT/IB03/02563

(51) Int. Cl.
  G06F 3/048   (2006.01)
  G06F 3/00    (2006.01)
  G09G 5/08    (2006.01)
  G06K 9/00    (2006.01)
  G06K 7/00    (2006.01)
(52) U.S. Cl. .................. 715/739; 715/863; 345/156; 382/187; 382/312
(58) Field of Classification Search ......... 715/784–786, 715/739; 345/684–688
See application file for complete search history.

(56) References Cited

U.S. PATENT DOCUMENTS

| | | | | |
|---|---|---|---|---|
| 5,283,560 A | | 2/1994 | Bartlett | ............... 345/113 |
| 5,644,628 A | * | 7/1997 | Schwarzer et al. | ....... 379/93.19 |
| 5,644,657 A | * | 7/1997 | Capps et al. | ............... 382/229 |
| 5,644,735 A | | 7/1997 | Luciw et al. | ............... 395/338 |
| 5,805,161 A | * | 9/1998 | Tiphane | .................... 715/786 |
| 6,011,542 A | | 1/2000 | Durrani et al. | ............. 345/156 |
| 6,064,766 A | | 5/2000 | Sklarew | ................... 382/189 |
| 6,088,481 A | | 7/2000 | Okamoto et al. | ........... 382/189 |
| 6,295,372 B1 | * | 9/2001 | Hawkins et al. | ............ 382/187 |
| 2003/0214540 A1 | * | 11/2003 | Huapaya et al. | ............ 345/863 |

FOREIGN PATENT DOCUMENTS

WO    WO 99/37075    7/1999

OTHER PUBLICATIONS

Camarda, Bill, "Special Edition Using Microsoft Word 2002", Jun. 18, 2001, QUE, all pages.*

* cited by examiner

*Primary Examiner*—William L Bashore
*Assistant Examiner*—Jordany Núñez
(74) *Attorney, Agent, or Firm*—Ware, Fressola, Van Der Sluys & Adolphson LLP

(57) ABSTRACT

There is disclosed a method and a device for inputting a character into an electronic device, said method comprising detecting an input, activating a temporary input area upon detection of said input, displaying said temporary input area on a display of said electronic device, and terminating the display and deactivating said temporary input area in case that a relevant event is detected. The relevant event may be another user-input.

20 Claims, 3 Drawing Sheets

METHOD AND DEVICE FOR OPERATING A USER-INPUT AREA ON AN ELECTRONIC DISPLAY DEVICE

CROSS-REFERENCE TO RELATED APPLICATION

Priority is claimed from International Application Number PCT/IB03/02563 filed Jul. 1, 2003

BACKGROUND OF THE INVENTION

The present invention relates to the field of electronic devices having a display. It also relates to electronic devices and keyboard-less electronic devices in a portable environment with a minimized use of a key-based entry. More specifically, the invention relates to a simple method to provide a user with a user interface (UI), wherein a conventional touch interaction based user interface is further developed and modified for a simpler input of characters and a faster scrolling or pre-selection of lists. The invention further relates to an electronic device offering a keyboard-less user interface as an alternative to keypad and display combinations. The present invention also relates to a user interface design for e.g. pen interaction with a touch screen device.

An electronic device typically includes applications where searching of a particular piece of information is required. "Contacts" is an example of such an application. In devices having a keypad, the search function can be implemented as a search bar, where the user can input letters to modify the search. Such a concept is not very useful in devices that do not have a keypad but only alternative input such as e.g. a touch screen.

The state of the art encompasses some electronic touch screen devices that are configured to show a special alpha toolbar adjacent below or at a side of the list in a list-based application. The toolbar can display characters in groups (ABC, DEF, GHI . . . ) and tapping of a group scrolls the contact list accordingly. Following to the selection of a group the list hops to the entry beginning with the first character of the group. Alternatively all characters of said group can be displayed in a sub-menu for selection. Another alternative solution provided by the state of the art is based on the T9 logic. The problem of this solution is that it takes much space in the user interface and it can only be used in situations where searching is very efficient—like the contacts application.

An efficient search in general lists is much more complicated in keyboard-less devices, since screen-based text input components take up space on the screen and text entry through them is slow.

All the above approaches for screen-based text input components have in common that they permanently require space in the user interface i.e. the touch screen, or adjacent to the screen e.g. in a pressure sensitive touch pad. Therefore, a screen-based text user-input component is needed to overcome these problems.

SUMMARY OF INVENTION

It is desirable to have a method enabling a user to efficiently search lists in electronic devices and in keyboard-less devices, without the need to waste much space of the display for a screen-based user-input component.

It is further desirable to have a text user-input component that enables fast text entry.

It is desirable to have a method enabling a user to efficiently search tables in electronic devices and in keyboard-less devices, without the need to permanently waste much space of the device for a user-input only component.

It is desirable to have a method enabling a user to efficiently search tables via pen interaction with a touch screen in electronic devices and in keyboard-less electronic devices, without the need to permanently waste much space of the display for a screen-based user-input component.

According to a first aspect of the present invention, a method for fast and simple user-input in an electronic display device is provided. The method comprises detecting of an input, activating an input area, displaying said component and terminating the display of said component.

By detecting an input for activating an input area, a user can request a simplified user-input interface. The input can be performed by an input, a 'tactile input', a touch related input or via a button i.e. a search button with an icon displayed on said display. The input can be performed e.g. via a mouse, a trackball, a touch pad or even a touch screen display. The input for activating an input area can be a combined scroll bar and a search button. The expression 'tactile' can refer to a user interface design for e.g. pen interaction with a touch screen device. The search button can be placed adjacent below or over the scroll bar. In case of a horizontal scroll bar, the search button can be placed adjacent to the left or right of the scroll bar. When placed besides a scroll bar, the search button requires no extra space, hence it is useable even in applications where a search function is not normally needed.

In the following the expression 'input' is used to denote an input to activate and display the input area. In the following the expression 'user-input' is used to denote an input provided by said input area (e.g. for entering a character, scrolling the list).

By displaying said input area on a display of said device, said input area defines an area in said display (e.g. a "window") indicating that a user-input can be performed. This can be performed by opening a semi-transparent window that opens at a location where the user can user-input a character to (re)define the search on activating the search button. The input area can be a touch sensitive select pad or a write pad (i.e. a character recognition area). The input area can be integrated into the display or can be placed adjacent to said display on said device. The input area can indicate the activation of a voice enabled user-input option.

In another example embodiment said method further comprises outputting an audio signal that is related to said displaying of said temporary input area on a display of said electronic device. In case of eg a voice user-input, the actual input area can also be implemented by audio messaging, so that a user can hear a simple beep or a spoken message that would indicate that a voice input area is now activated and ready for user-input. In this case a visual indication is not necessarily needed.

By activating a temporary input area on said device upon detection of said input, said input area can be provided with an increased resolution as regards pressure or location for a user-input to enable a user to perform e.g. a handwrite- or selection user-input into the device. This can be performed by increasing or adapting the processing of pressure information received from the input area. Similarly a voice user-input can be provided with an increased resolution as regards frequency, signal strength or frequency distribution to enable a user to perform a voice user-input into the device.

The input area can be temporarily brought on top of the actual content, so none of the space provided by the display has to be sacrificed to an input area permanently.

The basic method is terminated by closing the input area, (i.e. terminating the display of said temporary input area) in case that a relevant event is detected, thereby also deactivating the temporary input area. The relevant event encompasses a detected input, a detected user-input or a detected and recognized user-input, or the expiry of a certain period of time. The closing of the input area can also be performed in case of a relevant event defined as a 'close input area' input (outside the input area) or user-input (inside said input area). This may be embodied by a 'close' button or an 'ok' button provided within said temporary input area or within said display. Thus, a user may close the window by performing a respective input or user-input. It may be noted that the definition of the relevant event may comprise also a detected "non input", wherein the input area is closed in a timer controlled manner after lapse of a certain period of time. The relevant event can be a user-input directed to enter or select a character, an input or a user-input to close the input area, or a lacking of any input, indicating that the input area is not needed.

It may be noted that the benefits of the method are achieved in a device that does not have a keypad, but it can also be used in a device that has a keypad.

Another example embodiment of the electronic device is a touch screen device having a touch screen display. In another example embodiment of the present invention said temporary input area is displayed on said touch screen and said temporary input area is configured for a user-input via said temporary touch screen display.

By displaying said input area on a display of said device, said input area defines an area in said touch screen (e.g. a "window") indicating that a tactile or touch related user-input can be performed. This can be performed by opening a (e.g. semi-transparent) window that opens at a location where the user can user-input a character to (re)define the search on activating the search button. The input area can be a touch sensitive select pad or a write pad (i.e. a character recognition area). In case of an input area for a tactile user-input, said tactile user-input may be performed via a pen moved on the surface of said touch screen display.

By activating a temporary input area on a touch screen of said touch screen device upon detection of said input, said input area is provided with an increased resolution as regards pressure or location for a tactile user-input to enable a user to perform a handwrite- or selection user-input into said touch screen. This can be performed by increasing or adapting the processing of pressure information received from the area of the touch screen display said window is displayed in.

The input area is temporarily brought on top of the actual content, so that none of the space provided by the touch screen display has to be sacrificed to an input area permanently.

In another example embodiment, the method of the present invention further comprises depicting a scroll bar and a button for a search option (i.e. the search button) on the display (e.g. a touch screen) in the area that is normally reserved for a scroll bar. By using a search option, the detection of an input for activating a temporary input area can be performed by detecting an input in said search option. The depiction of the search option does not require any additional space in the user interface, which is a benefit of the invention. Since it is used for one-letter search and not entering of a search string, it can be simplified and optimized for this purpose.

In another example embodiment a scrollbar is depicted on said display (e.g. a touch screen), wherein said button for a search option is depicted adjacent to said scroll bar. In another example embodiment said button for a search option is depicted over said scroll bar. In another example embodiment said button for a search option is depicted under said scroll bar. In another example embodiment said button for a search option is depicted left to said scroll bar. In another example embodiment said button for a search option is depicted right to said scroll bar.

An alpha search enhanced scroll bar is a combination of a scroll bar and a search button. When pressed, the search button expands into a small input area for choosing a character. Once a character has been entered, the list can automatically scroll accordingly and the input area can be closed.

The invention may be implemented as a character search enhanced scroll bar in a combination of a scroll bar and a search button. When pressed, the search button expands into a small input area and the user can choose or user-input one (or more) character(s). Once one or more characters have been entered, the list automatically scrolls accordingly and the search component closes. It is possible to implement two search buttons in the scroll bar one for multi letter user-input and one for a one-letter user-input. One can be located on top and the other one can be located on the bottom of the search bar.

More than one character may be entered in the handwrite-recognition by writing in one place without following a line. In the character selection input area a user-input can be made by leading the user-input pen in a polygon, with corners or rest points denoting the elements of a word intro. A touch sensitive input area can be closed on detecting that the user retracts or lifts the pen from the touch sensitive surface, e.g. for longer than $2/10$ of a second. In case of a touch sensitive input area, the input area can be closed on detecting zigzag movements on the input area imitating a crossing out movement.

In another example embodiment the method further comprises detecting if a keyboard is connected to said device and suppressing the display of said search option, if a keyboard is connected. Thereby a feature manager application allows the user interface to display suitable controls for the device, depending on whether there is a keyboard available or not. Therefore, this control option "search button" should only appear when there is no keyboard in use.

In another example embodiment said method further comprises detecting a user-input related to said input area and executing an action related to said user-input. The detection of the user-input can further comprise recognizing said user-input. The recognition can comprise an identifying of a position of user-input or recognition of handwriting. The user-input related to said input area can be a touch pad or a touch screen user-input. The user-input related to said temporary input area can be a voice user-input. The latter option requires speech recognition capabilities.

In another example embodiment, said input area comprises handwriting recognition capabilities. Then the method comprises the recognition of handwriting in the input area, as an additional step. In case of a touch screen display the handwriting recognition input area can be depicted as a bordered area. The handwriting recognition input area can be the whole touch screen display, wherein a change of a background color, a change of a display illumination, a text in a newscaster or a replayed announcement may indicate an active handwriting recognition capability.

In another example embodiment said input area comprises the depiction of a number of selectable user-input choices. This may be implemented by a character selector, offering a number of user-input options for selection. The user-input selector can comprise the alphabet, a QWERTY keyboard, an ITU-T keypad or a selection of available user-inputs.

It is also possible to combine both types of input areas with a combined functionality, so the input area comprises a number of selectable user-input options e.g. characters and the device analyzes the user-input for a single dot- (or polygon-) like user-input according to the presented characters, indicating a selection or the device analyzes the user-input for a drawing movement indicating a handwriting user-input. This combination is simple and can be implemented as the handwriting area requires no structure in the input area and both user-inputs can easily be distinguished. So, a user can simply write or draw over the "keyboard" depicted in the input area on the touch screen display for handwriting user-input.

In another example embodiment of the present invention said input area is displayed in a semi-transparent manner superimposed on the standard display area. The input area can also be displayed in a non-transparent manner over the standard display contents. A semi transparent depiction enables the user to use the whole display area for reading and use the touch screen user-input for at least one of the superimposed layers. The foreground may be depicted in a semi-transparent manner and the background may show through the input area. It is also possible to use different colors for the two layers so that e.g. a light green writing represents the foreground and a dark red writing represents a background. Both layers can be depicted with contrasting colors, contrasting contrast or the like.

The overlying layers may be implemented by a bold font in the background and a delicate font in the foreground in contrasting colors on a background contrasting both. So, a user can read both writings, as the tiny slim foreground font cannot cover the bold background font and the bold background font can not hide behind said tiny slim foreground, whereby both texts can be read.

According to yet another aspect of the invention, a software tool is provided comprising program code means for carrying out the method of the preceding description when said program product is run on a computer or a network device.

According to another aspect of the present invention, a computer program product downloadable from a server for carrying out the method of the preceding description is provided, which comprises program code means for performing all of the steps of the preceding methods when said program is run on a computer or a network device.

According to yet another aspect of the invention, a computer program product is provided comprising program code means stored on a computer readable medium for carrying out the methods of the preceding description, when said program product is run on a computer or a network device.

According to another aspect of the present invention a computer data signal is provided. The computer data signal is embodied in a carrier wave and represents a program that makes the computer perform the steps of the method contained in the preceding description, when said computer program is run on a computer, or a network device.

According to another aspect of the present invention an electronic display device is provided. The display device comprises a central processing unit, a display and input means to operate or perform a user-input, which both are connected to said central processing unit. The display and said input means to operate an input are configured to act as an interface between said central processing unit and a user. The electronic device further comprises detecting means for detecting an input and to display an input for activating an input area, activating and operating said input area by displaying said input area on said display, means for detecting and recognizing a user-input related to said input area, and means for executing an action related to said user-input and terminate the display of said input area, in case that a relevant input or user-input event is detected.

In another example embodiment of said electronic device, said display and said input means to operate and preferably detect an input are comprised by a touch screen display. Thus, the electronic device requires only a single user interface. Preferably, said display and said input means to operate and preferably detect an input and said component to detect user-input are comprised by a touch screen display.

In another example embodiment of the present invention said electronic device is configured to depict a scroll bar on the display. By using a scroll bar, the user device can be used to quickly access lists and tables by scrolling.

In yet another example embodiment of the present invention said electronic device is configured to depict a button for a search option on the display, wherein the detection of an input for activating said temporary input area is performed by detecting an input on said button, e.g. via mouse, a trackball, a track roll or a touch pad.

In another example embodiment said electronic device is configured to depict said scroll bar and said button for a search option on the display in the area that is normally reserved for a scroll bar button. Thereby a user can use the scrollbar and the button for the search option without the need to sacrifice a part of the display area for providing said button or for providing said input area.

In yet another example embodiment said electronic device is configured to depict said button for a search option just under said scroll bar on the display. In one example embodiment said electronic device is configured to depict said button for a search option just over or overlying said scroll bar on the display.

In another additional example embodiment said electronic device is configured to display said temporary input area on said (e.g. touch screen) in a semi-transparent manner superimposed over the standard display area. Thus, upon activating said search button a semi transparent window is opened where the user can user-input a character to (re)define a user-input such as a search in a table.

In yet another example embodiment said electronic device is a keypad-less electronic device. Preferably said electronic device is a keyboard-less electronic device. It may be noted that the benefits of the method are achieved in a device that does not have a keypad, but it can also be used and achieved in a device that has a keypad In another example embodiment said electronic device further comprises an audio signal transducer that is connected to said central processing unit. The audio transducer can generate an audio signal that is related to said temporary input area. By using an audio transducer, the device can output an audio signal when displaying or activating said temporary input area. By using an audio transducer, the device can further output an audio signal when terminating the displaying of said temporary input area.

BRIEF DESCRIPTION OF THE DRAWINGS

In the following, the invention will be described in detail by referring to the enclosed drawings in which.

DETAILED DESCRIPTION OF THE INVENTION

Figure 1:
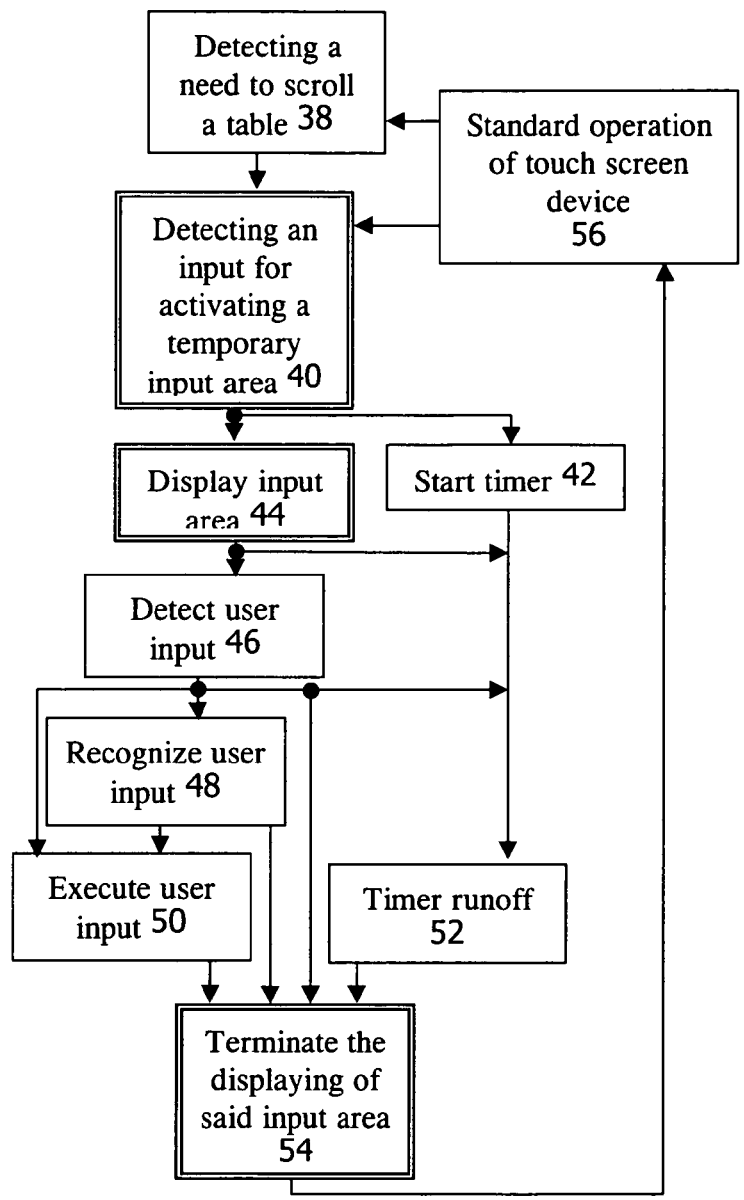
FIG. 1 is a flowchart of the method according to one embodiment of the present invention.

FIG. 1 is a flowchart of the method according to one embodiment of the present invention. To provide as much information as possible, a double outlining emphasizes the basic elements 40, 44 and 54 of the method. All of the other elements may be economized in different combinations.

The method starts with the detection 38 of a need to scroll a table. This need may occur in case of lists (i.e. one-column tables such as telephone number lists), in case of a database program or a table based program. The need to scroll a table can be accompanied in conventional applications by the depiction of a scrollbar in said display. According to the present invention there is also depicted with the scroll bar (in or adjacent to the scrollbar) a search button on said display.

The method proceeds with the detection or the reception 40 of a (e.g. tactile) input for activating a temporary input area, e.g. by an activation of said search button e.g. by mouse cursor or touch screen input. Following that the device opens 44 an input area on the display. The input area can be a character selector i.e. a field presenting a number of characters for selection and/or a hand writing recognition window.

The opening of the input area can be accompanied with the starting 42 of a timer. If the timer is started and no user-input is detected the input area can be closed 54 after the runoff 52 of said timer. The input area can be closed 54 after the runoff 52 of said timer, even if a user-input has been started but not terminated, notwithstanding the state the device is actually in.

In the following it is assumed, that a user performs 46 a user-input.

In case that the input area acts as a character selector, the user-input can actually be executed after detection of the user-input, as a recognition operation is not necessary and the input area can be closed 54.

In case that the input area acts as a hand writing recognition window, the user-input is to be recognized 48 by the device and can be executed 50 after the recognition 48 of the user-input and the input area can be closed 54.

It may be noted that the execution of the user-input can be performed after, before or simultaneous with the closing of the input area.

Finally the device and the display contents return to the normal operation 56, ready for detecting a next need to scroll a table or for receiving a next input for requesting an input area. This depends on the actually selected application running on the electronic device.

Figure 2:
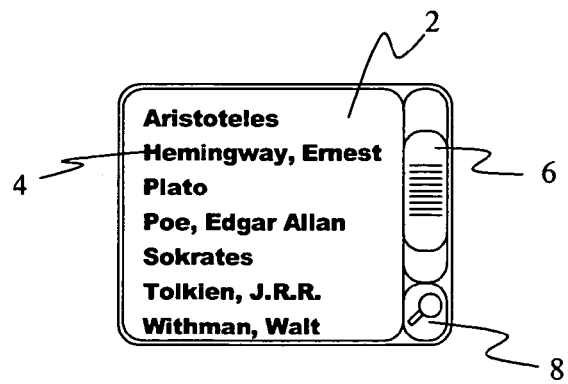
FIGS. 2 to 6 are examples of a device and the interface for a user interaction according to other embodiments of the present invention.

FIG. 2 represents a top view of a keyboard-less or keypad-less electronic device. The figure represents a front view of the device, wherein a display (here a touch screen) 2 occupies the whole front side of the device. Therefore internal elements such as a processing unit, a power supply and the like are not depicted but omitted. In the display there is depicted a list of names 4 e.g. of a contact application or the like. The device comprises a scroll bar 6 that can be provided in the (touch screen) display itself. The scroll bar may also be provided as a mechano-electrical input feature beside the display 2. According to the invention, a search button 8 is provided in the device. The search button 8 can be provided as an in-screen feature or as an extra button on the housing of the device. The search button 8 can be provided with an icon such as a magnifying glass. The drawing shows a selection list 4 and a scroll bar 6. At the bottom of the scroll bar 6, there is a search option (icon button) 8 that contains the search component, i.e. unfolds to an input area upon activating the input option.

When the list represents a list of names, the search button 8 can be provided as an alpha search button. If the alpha search button at the bottom of the scroll bar is pressed, it expands into a handwriting recognition area and/or a character selector, depending on design and possibly on the choice of a user.

Figure 3:
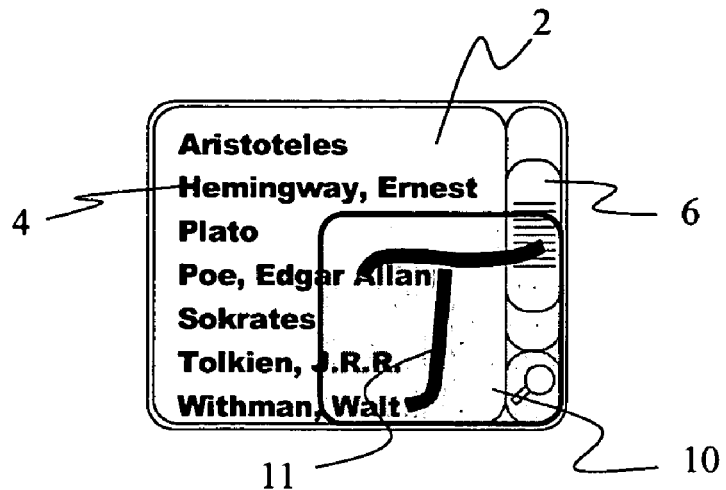

FIG. 3 is an example, wherein the pressing of the search button 8 in the alpha search enhanced scroll bar opens a hand writing recognition window 10 that is as simplified as possible. The hand writing recognition window 10 is depicted in a semi transparent manner, to indicate the area wherein hand-writing recognition is possible. The semi transparent depiction of the hand writing area enables the user to read information even from behind the recognition area.

An icon e.g. a small pencil or the like or another element (e.g. text, announcement) can be added to the area to indicate that the area is for writing. A close option can be provided but may be economized, as the area can be minimized automatically, if a character is entered or an idle timeout is reached. In the hand writing recognition window 10 a written "T" is depicted to indicate a user-input to search the list 4 for entries starting with a "T".

Figure 4:
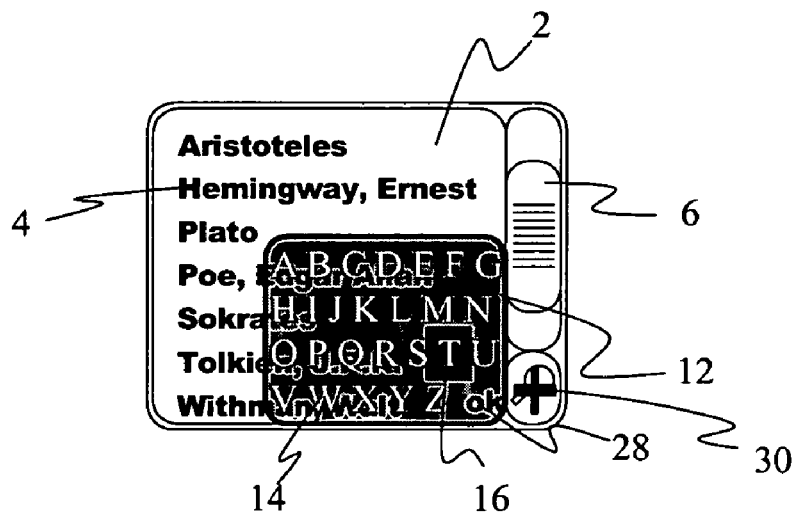

FIG. 4 represents another example where the expanded control/input area 14 is a character selector. The character selector comprises a number of selectable characters (i.e. the alphabet) 12. In another embodiment e.g. in search applications a subset of the characters, e.g. only the initials occurring in the list can be provided. In telephone number search applications the character selector can comprise numbers. The user has just selected "T" and the window indicates 16 the selected character before it closes automatically. In this situation, it is possible to leave out such symbols and characters that are not usually used to scroll a list, for instance punctuation marks and numbers.

FIG. 4 comprises two other differences as compared to FIG. 3. The character select input area is moved more to the middle of the display area, and the input area 14 comprises a small 'ok' element 28. The 'ok' element 28 can provide a closing function of said input area. The closing option can be used to close the input area when the user does not want to select one of the depicted characters, or when the user want to close the input area/input-option after having entered a number of different characters to terminate e.g. a character string.

The character select input area is moved more to the middle of the display area, to not overlay the search button 8 depicted in FIG. 2. Instead of a moved input area the input area may comprise a gap to not occupy the area of the search button. Basically, the input area may overly the input button, as the basic functionality to open or activate the input area is not longer needed. The search button is provided with a sign 30 (here a cross) to indicate a changed functionality when the temporary input area is active. The changed functionality may reside in a closing function for closing said temporary input area. The changed functionality may reside in an altering function for changing the depicted character selector to hand-writing recognition area, or other possible user-input options (see FIG. 5).

Figure 5:
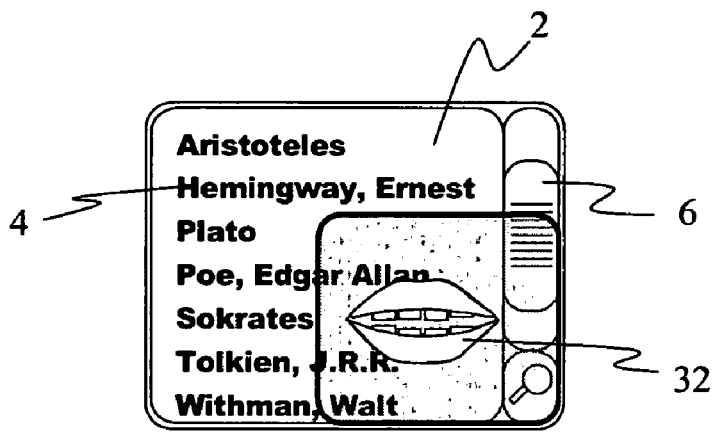

It may to be noted that both elements: the closing function 28 and the changed search button functionality 30 can be provided with any of the temporary input areas depicted in any of FIGS. 3 to 5.

In case of a touch screen the user just has to tap onto the "T". With a touch screen display it is possible to combine both types of input areas: the character selector and the handwriting recognition window with a combined functionality, so the input area comprises a number of selectable user-input options e.g. characters and the device analyzes the user-input for a single dot- (or polygon-) like user-input according to the presented characters, indicating a selection or the device analyzes the user-input for a drawing movement indicating a recognizable handwriting user-input. The method of operating said temporary input area would further comprise to analyze the user-input on said touch screen display for a handwriting recognition and for character select user-input and execute the user-input first recognized.

FIG. 5 represents another example where the expanded input area 32 is a voice-input area. In contrast to the FIGS. 3 and 4, the input area itself may not be able to transform a (sound) user-input into an electrically coded user-input. In FIG. 5 the input area 32 serves as an indication of activated voice user-input.

In case of a touch screen display the voice-input areas may be combined with a character selector as depicted in FIG. 4 and/or with a handwriting recognition window as depicted in FIG. 3.

Figure 6:
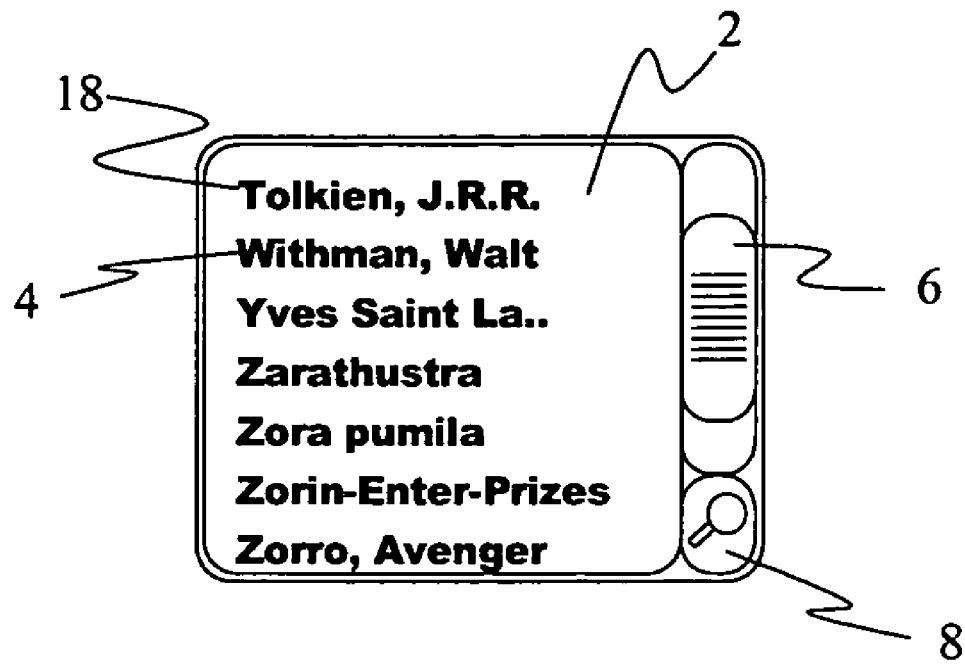

FIG. 6: After the user has entered the character according to FIG. 3 or 4, the list scrolls accordingly. Following a user-input of a "T", the list 4 is scrolled to the entry 18 starting with a "T". The logic of scrolling might vary depending on whether the list is alphabetically sorted or not—different types of logic for one-letter user-input or one letter scrolling already exist.

Figure 7:
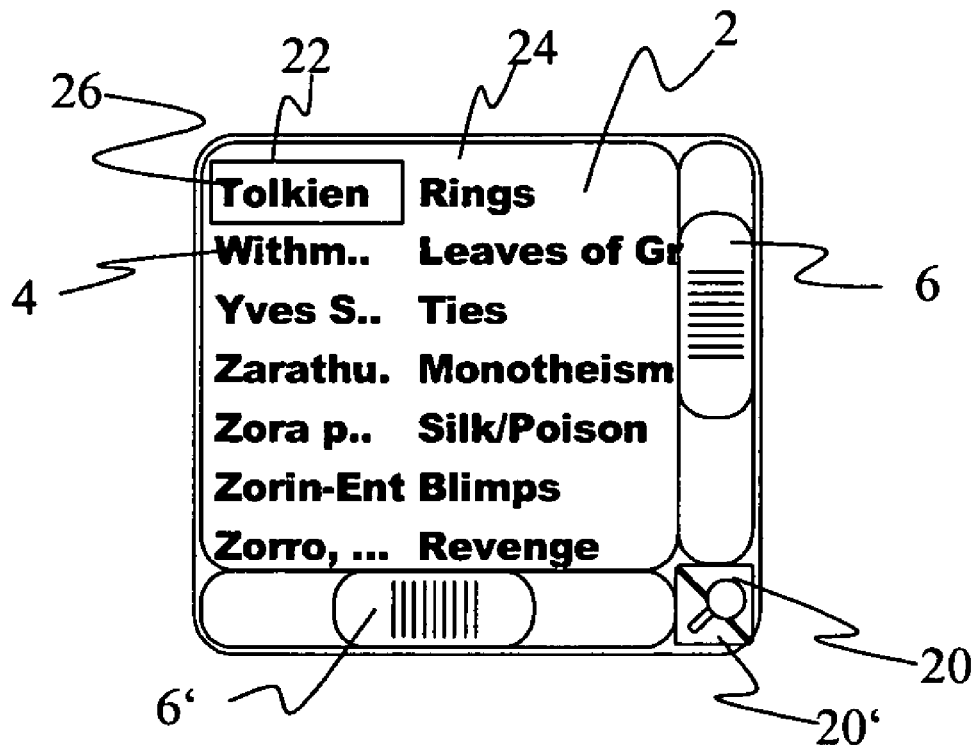
FIG. 7 is an additional example of a device and the interface for accessing of tables according to another embodiment of the present invention.

FIG. 7 represents another example that is optimized for the scrolling of tables. The two columns 22 and 24 represent a two-column table or a part of an even bigger table. The device comprises two scroll bars 6 and 6' to enable horizontal and vertical scrolling of the table. To facilitate the scrolling, a cursor 26 may be provided that can be moved by using the scroll bars 6, 6'. According to the invention the search button is provided as a two-part search button 20, 20' for searching the table in horizontal and vertical directions analogous to that disclosed in FIGS. 2 to 5. The user may select one of the search buttons 20, 20' to activate character selectors or handwriting recognition windows. The user may select that the horizontal search button 20 activates a character selector and the vertical search button 20' activates a hand writing recognition window, or vice versa. It may be noted that the search button functionality can also be integrated in the cursor, activating an input area upon an input such as "double click" or in the case of a touch screen device a "double tap" or "multi-tap" in the scrollbar or anywhere in the window.

The invention allows a user to enter a part of a list/table entry with a "touch screen" keyboard or write pad to locate or search a list/table entry.

An alpha search enhanced scroll bar places the search option into the area that is normally reserved for a scroll bar. Therefore, it requires no space in the user interface which is a benefit of the invention. Since it is used for one-letter search, not entering a search string, it can be simplified and optimized for this purpose.

This solution does not take up any extra space, and it can be used anywhere in the UI where there is a selection list. Hence it is useable even in applications where a search function is not normally needed. It is also possible to make this solution look and behave in a very simple and likewise pen-optimized way.

The area to tap might be quite small. However, it can be made at least as big as the Scroll Bar arrow, which needs to be made big enough for tapping anyway. Also if the search button is placed in the corner of the display, the pen can be guided by the edge of a display frame.

In the proposed solution the scroll bar will be shorter than normally. However, since the control otherwise saves space by not requiring an additional search field or alpha toolbar in the display, the scroll bar height is still the same as in the existing alternative methods. The smaller scroll bar can be compensated e.g. by a progressive scrolling behavior of the scroll bar.

This application contains the description of implementations and embodiments of the present invention with the help of examples. It will be appreciated by a person skilled in the art that the present invention is not restricted to details of the embodiments presented above and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. A method, comprising:
    depicting a scroll bar and a button for a search option on a display of an electronic device in an area that is normally reserved for a scroll bar,
    detecting if a keyboard is connected to said device and suppressing the display of said button for a search option, if the keyboard is connected,
    detecting an input on said button for activating a temporary input area,
    activating said temporary input area upon detection of said input,
    displaying said temporary input area on the display of said electronic device,
    outputting an audio signal indicating said displaying of said temporary input area, and
    terminating the display of said temporary input area and deactivating said temporary input area in case that a relevant event is detected,
    wherein said temporary input area is displayed in a semi-transparent manner superimposed on a standard display area on said display, and
    wherein input functions in said standard display area superimposed by said temporary input area are deactivated when said temporary input area is displayed.

2. The method according to claim 1, wherein said electronic device is a touch screen device and said display is a touch screen display.

3. The method according to claim 2, wherein said temporary input area is displayed on the touch screen display and said temporary input area is configured for a user-input via said touch screen display.

4. The method according to claim 1, wherein said button for a search option is depicted adjacent to said scroll bar.

5. The method according to claim 1, further comprising:
    detecting a user-input related to said depicted temporary input area,
    recognizing said user-input, and
    executing an action related to said recognized user-input.

6. The method according to claim 1, wherein said temporary input area has handwriting recognition capabilities.

7. The method according to claim 1, wherein said temporary input area comprises a depiction of a number of selectable user-input options.

8. A computer program product comprising a computer readable storage medium storing program code thereon for use by an electronic device, said program code comprises:
    instructions for depicting a scroll bar and a button for a search option on a display of an electronic device in an area that is normally reserved for a scroll bar,
    instructions for detecting if a keyboard is connected to said device and suppressing the display of said button for a search option, if the keyboard is connected, instructions for detecting an input on said button for activating a temporary input area, instructions for activating said temporary input area upon detection of said input, instructions for displaying said temporary input area on the display of said electronic device, instructions for outputting an audio signal indicating said displaying of said temporary input area, and instructions for terminating the display of said temporary input area and deactivating said temporary input area in case that a relevant event is detected, wherein said temporary input area is displayed in a semi-transparent manner superimposed on a standard display area on said display, and wherein input functions in said standard display area superimposed by said temporary input area are deactivated when said temporary input area is displayed.

9. The computer program product of claim 8, wherein the program code is downloaded from a server.

10. An apparatus, comprising:
a central processing unit,
a display connected to said central processing unit, said display being configured to act as an interface between said central processing unit and a user for receiving inputs from said user, and
an audio signal transducer connected to said central processing unit for outputting audio signals, wherein said apparatus is configured to depict a button for a search option on said display in an area that is normally reserved for a scroll bar, detect if a keyboard is connected to said apparatus and suppressing the display of said button for a search option, if the keyboard is connected, detect an input on said button for activating a temporary input area, activate a temporary input area upon detection of said input, and display said temporary input area in a semi-transparent manner superimposed on a standard display area on said display, wherein said audio transducer is configured to output an audio signal indicating said displaying of said temporary input area, wherein said display of the temporary input area is terminated and said temporary input area is deactivated in case that a relevant event is detected, and wherein input functions in said standard display area superimposed by said temporary input area are deactivated when said temporary input area is displayed.

11. The apparatus according to claim 10, wherein said display is a touch screen display.

12. The apparatus according to claim 10, wherein said apparatus is configured to depict a scroll bar on said display.

13. The apparatus according to claim 10, wherein said apparatus is configured to depict a scroll bar and a button for a search option on said display in the area that is normally reserved for a scroll bar.

14. The apparatus according to claim 10, wherein said apparatus is configured to depict said button for a search option adjacent and under said scroll bar on said display.

15. The apparatus according to claim 10, wherein said apparatus is a keypad-less electronic device.

16. The apparatus according to claim 10, wherein the apparatus is configured to detect and recognize a user-input on the temporary input area, and execute an action related to said user-input on the temporary input area.

17. The method according to claim 2, wherein the relevant event is one of the following: an input inside the temporary input area, an input outside the temporary input area commanding to close the temporary input area, and lapse of a predetermined time if no input is detected.

18. The method according to claim 3, wherein when the temporary input area is activated, the user-input on the temporary input area is not recognized as a user-input on the standard display area superimposed by the temporary input area.

19. The apparatus according to claim 10, wherein the relevant event is one of the following: an input inside the temporary input area, an input outside the temporary input area commanding to close the temporary input area, and lapse of a predetermined time if no input is detected.

20. The apparatus of claim 11, wherein when the temporary input area is activated, an input on the temporary input area is not recognized as an input on the standard display area superimposed by the temporary input area.

* * * * *